US008095960B2

(12) United States Patent
Boogert et al.

(10) Patent No.: US 8,095,960 B2
(45) Date of Patent: Jan. 10, 2012

(54) SECURE SYNCHRONIZATION AND SHARING OF SECRETS

(75) Inventors: Kevin Marinus Boogert, Sandy, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1181 days.

(21) Appl. No.: 11/284,364

(22) Filed: Nov. 21, 2005

(65) Prior Publication Data

US 2007/0118733 A1    May 24, 2007

(51) Int. Cl.
*G06F 21/00* (2006.01)

(52) U.S. Cl. ............... 726/1; 726/2; 713/155; 713/182; 709/215; 380/224

(58) Field of Classification Search .................. 713/155, 713/182, 202; 726/1
See application file for complete search history.

(56) References Cited

U.S. PATENT DOCUMENTS

| | | | |
|---|---|---|---|
| 5,481,613 A | 1/1996 | Ford et al. | |
| 5,991,399 A | 11/1999 | Graunke et al. | |
| 6,215,878 B1 | 4/2001 | Harkins | |
| 6,243,816 B1 * | 6/2001 | Fang et al. | 726/5 |
| 6,550,009 B1 | 4/2003 | Uranaka et al. | |
| 6,601,171 B1 * | 7/2003 | Carter et al. | 713/175 |
| 6,694,025 B1 | 2/2004 | Epstein et al. | |
| 6,711,263 B1 | 3/2004 | Nordenstam et al. | |
| 6,738,907 B1 | 5/2004 | Carter | |
| 6,760,843 B1 | 7/2004 | Carter | |
| 6,971,005 B1 * | 11/2005 | Henry et al. | 713/155 |
| 6,978,376 B2 * | 12/2005 | Giroux et al. | 713/189 |
| 7,185,364 B2 * | 2/2007 | Knouse et al. | 726/8 |
| 7,409,543 B1 * | 8/2008 | Bjorn | 713/155 |
| 7,444,666 B2 * | 10/2008 | Edwards et al. | 726/1 |
| 7,503,062 B2 * | 3/2009 | Wong et al. | 726/2 |
| 7,536,722 B1 * | 5/2009 | Saltz et al. | 726/20 |
| 2003/0005112 A1 * | 1/2003 | Krautkremer | 709/224 |
| 2003/0023562 A1 * | 1/2003 | Bailey et al. | 705/51 |
| 2003/0088771 A1 * | 5/2003 | Merchen | 713/175 |
| 2003/0154380 A1 * | 8/2003 | Richmond et al. | 713/182 |
| 2004/0083367 A1 * | 4/2004 | Garg et al. | 713/170 |
| 2004/0210771 A1 * | 10/2004 | Wood et al. | 713/201 |
| 2004/0259534 A1 * | 12/2004 | Chaudhari et al. | 455/414.1 |
| 2004/0260953 A1 * | 12/2004 | Jamieson et al. | 713/202 |
| 2005/0262361 A1 * | 11/2005 | Thibadeau | 713/193 |
| 2005/0273862 A1 * | 12/2005 | Benaloh et al. | 726/26 |
| 2005/0289356 A1 * | 12/2005 | Shoham | 713/183 |
| 2006/0059544 A1 * | 3/2006 | Guthrie et al. | 726/4 |

(Continued)

OTHER PUBLICATIONS

Luo et al., A common password method for protection of multiple accounts, Personal, Indoor and Mobile Radio Communications, 2003. PIMRC 2003. 14th IEEE Proceedings on, vol. 3, on pp. 2749-2754 vol. 3.*

Burns et al., "Safe caching in a distributed file system for network attached storage", Parallel and Distributed Processing Symposium, 2000. IPDPS 2000. Proceedings. 14th International, Issue Date: 2000, on pp. 155-162, Meeting Date: May 1, 2000-May 5, 2000, Location: Cancun, Mexico.*

*Primary Examiner* — Taghi Arani
*Assistant Examiner* — Morshed Mehedi
(74) *Attorney, Agent, or Firm* — Schwegman, Lundberg & Woessner, P.A.

(57) ABSTRACT

Techniques are provided for secure synchronization and sharing of secrets. A first principal acquires an encrypted access key to a secret store of a second principal. The first principal contacts an identity manager and supplies a decrypted version of the access key. One or more secrets of the second principal may be acquired or modified by the first principal while accessing the secret store.

15 Claims, 3 Drawing Sheets

U.S. PATENT DOCUMENTS

2006/0112283 A1* 5/2006 Eldridge et al. .............. 713/193
2006/0155773 A1* 7/2006 Drouet et al. ................. 707/200
2006/0242415 A1* 10/2006 Gaylor .......................... 713/176
2007/0271592 A1* 11/2007 Noda et al. ....................... 726/1

* cited by examiner

SECURE SYNCHRONIZATION AND SHARING OF SECRETS

FIELD

The invention relates generally to networking and more particularly to secure synchronization and sharing of secrets within a networked environment.

BACKGROUND

As users access more and more services remotely over the Internet, they have also accumulated a variety of disparate passwords for accessing those services. In some cases, the users attempt to manage these passwords themselves, which becomes difficult to achieve because frequently a service will have its own requirements with respect to the format of its passwords and with respect to password policies. For example, one service may require that a password have at least one numeric character and an uppercased alphabetic character. Conversely, some others may require a punctuation character. Still further, some services may require that passwords be re-established or reset after a predefined elapsed period of time. Thus, the format and policies will often vary from service to service. As a result, a user can quickly become overwhelmed with managing passwords for services that the user interacts with.

To make management easier, some users may attempt to keep a single password for all services. Thus, when one service's policy requires a change, the user manually changes the password with all the other remaining services. This approach also has some security risks, since if the password is compromised, the password can be used with all other services associated with the user. Moreover, intruders will often assume users have the same password because of the management challenges associated with maintaining passwords. Thus, if a password is compromised it is entirely likely that the other services of the users are also going to be compromised.

Some directory services or password services have somewhat alleviated the problem by permitting users to store their various passwords in a central repository. Users access the central repository with a different key or password that identifies them to the directory service and from there the users are either supplied their encrypted passwords for decryption or the directory service supplies selective passwords to desired services on behalf of the users. In some cases, the directory service will not even be capable of decrypting the encrypted passwords. This is convenient for the users and is generally a secure approach. Additionally, with an approach such as this a user is not tempted to have a single password for all the various services of the user, since management can be facilitated through the password service.

However, there is still a significant amount of manual effort that is required of a user to maintain his/her list of passwords, because when changes are needed for a particular password the user must request the password from the directory service, decrypt it, and then submit it to the service and make the change when a policy of the service dictates that the password must be changed after an expiring period. The newly established password must then be encrypted and updated to the central repository of the password service.

Thus, although users may not have to manually keep track of all their various passwords if they deploy an automated service, the users still have to manually manage the re-establishing of these passwords as policies are enforced with the various services to which the passwords relate.

SUMMARY

In various embodiments, techniques are provided for securely synchronizing and sharing secrets. A key is received from a first principal for purposes of accessing a secret store of a second principle. The key is validated and if validated, access is granted the first principal for purposes of gaining access to the secret store of the second principal.

DETAILED DESCRIPTION

A "resource" includes a user, service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "agent" may be viewed as a true persona of principal. That is, an agent is a primary identity for a principal, such that the agent is permitted to manage the other identities that may be associated with principal and create new identities for the agent. Any particular assumed identity for an agent is dependent upon contexts and perhaps directions of the agent.

An "identity" is something that is formulated from a one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc. As more and more identifiers are accumulated, a confidence in a particular identity grows stronger and stronger.

An "identity manager" is a service that manages secrets on behalf of a principal. The identity manager may itself be viewed as a principal in any given network transaction. The identity manager may interact with a directory service or another service to manage the secrets of the principal in one or more repositories. The secrets may be keys, passwords, or other identifiers used by the principal to interact with services over a network.

In an embodiment, some identifier information for an agent may be acquired from an identity service. Examples of some identity services may be found in U.S. Ser. No. 10/765,523, entitled "Techniques for Dynamically Establishing and Managing Authentication and Trust Relationships," filed Jan. 27, 2004; U.S. Ser. No. 10/767,884, entitled "Techniques for Establishing and Managing a Distributed Credential Store,"

filed Jan. 29, 2004; and U.S. Ser. No. 10/770,677, entitled "Techniques for Dynamically Establishing and Managing Trust Relationships," filed on Feb. 3, 2004. The disclosures of which are incorporated by reference herein.

Various embodiments of this invention can be implemented in existing network architectures. For example, in some embodiments, the techniques presented herein are implemented in whole or in part in the Novell® network and proxy server products, identity management services, and/or directory services, distributed by Novell®, Inc., of Provo, Utah.

Of course, the embodiments of the invention can be implemented in a variety of architectural platforms, operating and server systems, or services. Any particular architectural layout or implementation presented herein is provided for purposes of illustration and comprehension only and is not intended to limit aspects of the invention.

Figure 1:
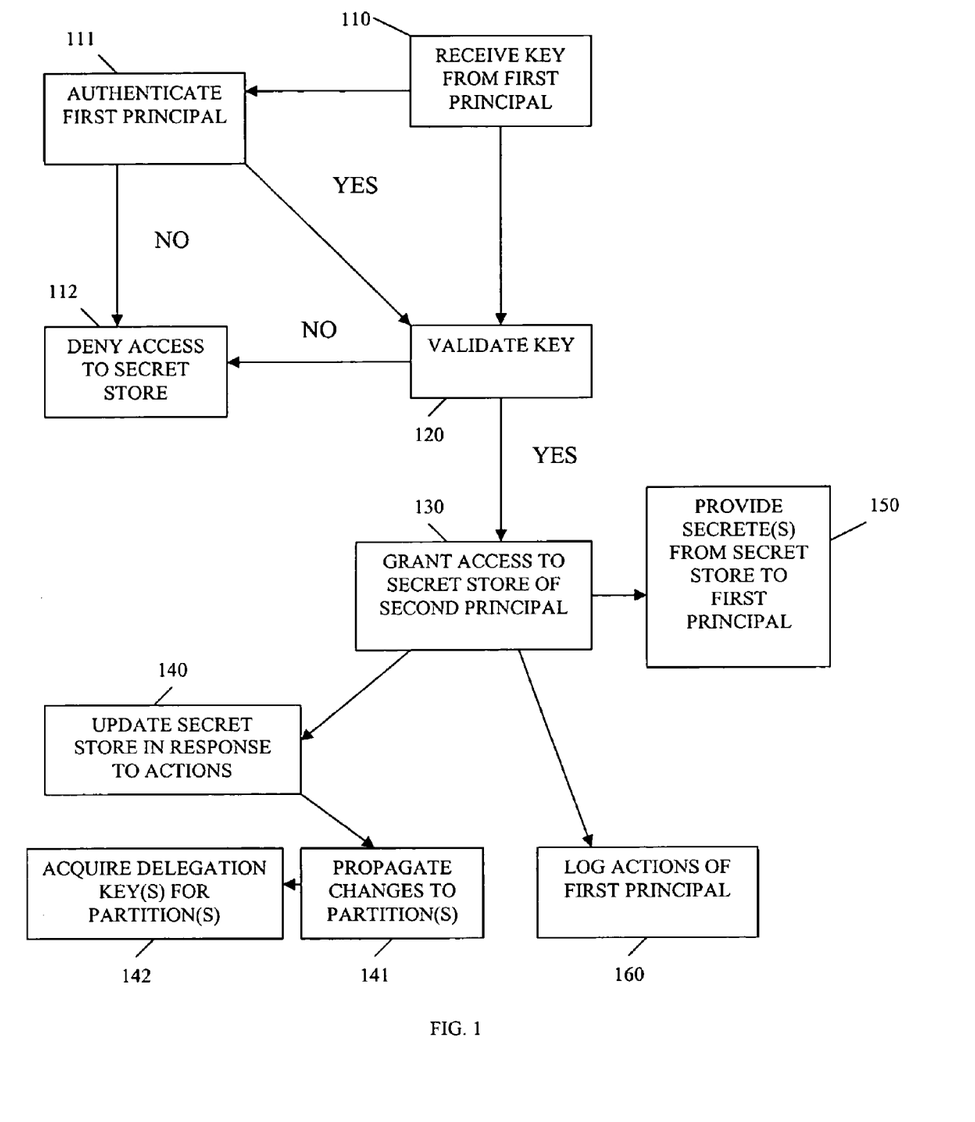
FIG. 1 is a diagram of a method for sharing and synchronizing access to a secret store, according to an example embodiment.

FIG. 1 is a diagram of a method 100 for sharing and synchronizing access to a secret store, according to an example embodiment. The method 100 (hereinafter "identity management service") is implemented in a machine-accessible and readable medium. The identity management service is operational over and processes within a network. The network may be wired, wireless, or a combination of wired and wireless. In an embodiment, the identity management service interacts with identity services, such as the identity services discussed and incorporated by reference above.

The identity management service facilitates the synchronization and sharing of secrets associated with principals. These secrets or identifiers (e.g., passwords, keys, certificates, etc.) are maintained in one or more secret and secure stores. In an embodiment, the secrets are encrypted within the secret store. The secrets are used by a principal to access network services.

Initially, at 110, the identity management service receives a key from a first principal. The key is associated with gaining access to a secret store of a second principal. Access may be achieved by using the access key as a decryption key to decrypt the secret store and it may also be used to re-encrypt the secret store. That is, the secret store's access is controlled by the identity management service in a secure environment and access is permitted if a proper key is supplied to acquire access. Conventionally, it is only the second principal that possesses the access key. In fact, the key may not even be stored by the identity management service. Thus, even a super-user or administrator will not be able to acquire the key and access the secret store of the second principal.

In some cases, the key may be obtained as metadata that has been associated with the first principal. Here, the key of the second principal was stored with the identity manager service or an identity service by the second principal and, optionally encrypted with a public key of the first principal; this protects the key and allows the first principal to obtain it from metadata using the first principal's private key to decrypt. So, the second principal may provide the key to the first principal by altering existing or associating new metadata with the first principal and that metadata includes the key of the second principal.

According to an embodiment, at 111, the identity management service may first authenticate the first principal that supplied the key before consideration of the key is addressed. So, a requesting first principal will undergo an authentication procedure during which the identity management service satisfies itself via identifiers supplied by the first principal that the first principal is an authorized user of the identity management service and that the first principal is who it purports to be. If authentication is not achieved, then, at 112, access to the secret store is denied and in fact access to the identity management service is denied.

At 120, the identity management service validates the key supplied by the first principal. The key, if valid, corresponds to a particular secret store being managed by the identity management service. That secret store belongs to a second principal. If the key is not capable of being validated, then processing ceases, at 112, and access to the secret store is denied.

However, if, at 120, the identity management service is able to validate the key as a valid key associated with the second principal's secret store, then, at 130, the first principal is granted access to the second principal's secret store. In some cases, the key may also be used by the first principal to decrypt the second principal's secret store. That is, the key may have been used to encrypt the secret store or may be used as an access key via the identity management service. In still other embodiments, an identity service may use the key as a credential to enable access control to the secret store via the identity management service.

A variety of policies may be enforced by the identity management service against access to the secret store in response to the identity of the first principal. These policies may restrict access to certain entries within the secret store, may limit operations that may be performed, may drive an amount of time that the first principal may access the secret store, and the like. Policies may be established by the second principal and/or by administrators. Also, the policies may be applied globally against all secret stores being managed by the identity management service and/or may be applied locally against a specific secret store, against certain entries within a specific secret store, or even against certain predefined groupings of entries within a specific secret store. In some cases, the policies may be acquired in response to a contract that defines the relationship between the first principal and the second principal.

In an embodiment, at 140, the first principal may change an entry or secret within the secret store of the second principal during access to the secret store. In some cases, the first principal may use the previously acquired access key to encrypt the secret store after the change. In response to such an action, the identity management service may update the secret store. Notifications may also be sent to the second principal when updates have occurred.

In some cases, at 141, the second principal's secret store may be partitioned into multiple complete or partial replicated copies. Each partition may be used by different principals or services, which the second principal has authorized. Moreover, each partition may have its own predefined access policies and its own individual access key.

Accordingly, if one or more partitions of the secret store exist, then, at 141, the identity management service can synchronize and propagate a modification made in the secret store by the first principal to each of the partitions. This will keep the various partitions in synchronization with one another and with the secret store (master version). The partitions may each have their own independent access key, which actually serves as a decryption key for decrypting a particular partition that was encrypted with the access key previously.

In an embodiment, at 142, one technique that would permit the identity management service to access affected partitions that require synchronization may be acquiring delegation keys or different access keys from the secret store, where each delegation key provides access to a particular one of the partitions. Each delegation key is a key that is used to encrypt or decrypt a particular partition to which it is associated.

This may be useful when the identity management service does not have direct control over the partitions and where the partitions are controlled by either another processing instance of the identity management service or by another service altogether. The secret store may include entries that identify a partition and a delegation key to use for purposes of accessing that partition. So, the identity management service detects a partition affected by a change made to the secret store by the first principal, accesses the secret store to acquire a delegation key, and uses the delegation key to contact another service that controls the partition in question and propagates the change in that partition. In some cases, the identity management service uses the initial access key to decrypt the secret store which then permits the delegation key to be acquired from the secret store for a particular partition. The identity management service uses the delegation key to decrypt and re-encrypt the particular partition to which the delegation key is associated.

In a similar manner, a service controlling a partition may have a delegation key within that partition that permits access back to the secret store, such that changes in the partition can be synchronized back to the master secret store. In this scenario, if other partitions exist, then the identity management service may acquire their delegation keys from the master secret store and further propagate the changes to the other partitions in a manner described above. Thus, changes to secrets can be synchronized with other copies or subset copies of the master secret store and vice versa through the use of delegation keys housed within the secret store and/or the partitions.

According to an embodiment, at 150, when the first principal accesses the secret store of the second principal, the identity management service may provide encrypted secrets included within the secret store to the first principal. The first principal through prior arrangements (acquisition of the access key that permits the first principal to decrypt the secret store) with the second principal and can then decrypt and use the secrets to access services on behalf of the second principal. As was mentioned above, in some instances, the second principal may actually modify existing metadata associated with the first principal or generate new metadata associated with the first principal, the metadata accessible to the first principal through the identity manager service or through an identity service. Moreover, the metadata includes the access key; and in some cases that access key was encrypted by the second principal using a public key of the first principal.

As an example of this consider a financial service of the second principal. The financial service may require that the second principal access its account via a password. Now suppose that the password expires every thirty days and must be reset or suppose a new password policy is being implemented by the financial service where a valid password now has to include a punctuation character. A first principal may be an administrator or automated service of the second principal that identifies this situation and wants to change the password on behalf of the second principal. To do this, the first principal gets proper authorization from the second principal by acquiring the access key to the secret store. Acquisition of the access key can be obtained in a variety of manners, such as directly from the second principal; indirectly from the second principal as metadata associated with the first principal; or from an identity service providing access to the first principal to acquire the access key of the second principal. The access key is used to contact the identity management service and to access the secret store where the second principal's old and now invalid financial service's password exists. That access key may then be used to decrypt the encrypted financial service's password. Accordingly, the first principal acquires the old password from the secret store and uses it to interact with the financial service to re-set the password and then the first principal updates the changed and new password back to the secret store and may re-encrypt the new password using the access key.

In this scenario, the second principal may not even have to be aware that a password was changed for the financial service or that it needed to be changed, and the next time the second principal goes to access the financial service the new password will be acquired from the secret store by the second principal and it will work properly with the financial services. It is readily appreciated that such a scenario provides automated password management for the second principal in manners that have not been possible before. In fact, the new password may be a randomly generated string that conforms to a password policy, resulting in a password that thwarts may of the password guessing schemes used by hackers.

In yet another embodiment, at 160, the identity management service may log each action of the first principal with respect to accessing the secret store of the second principal. The log information may be used for audit tracking or reporting purposes. In this manner, the second principal may periodically audit activities occurring with its secret store and/or may receive periodic reports detailing activities of the first principal. The second principal may use this to add more restrictive policies or more generous and expansive policies that affect the access rights of the first principal to the secret store.

Figure 2:
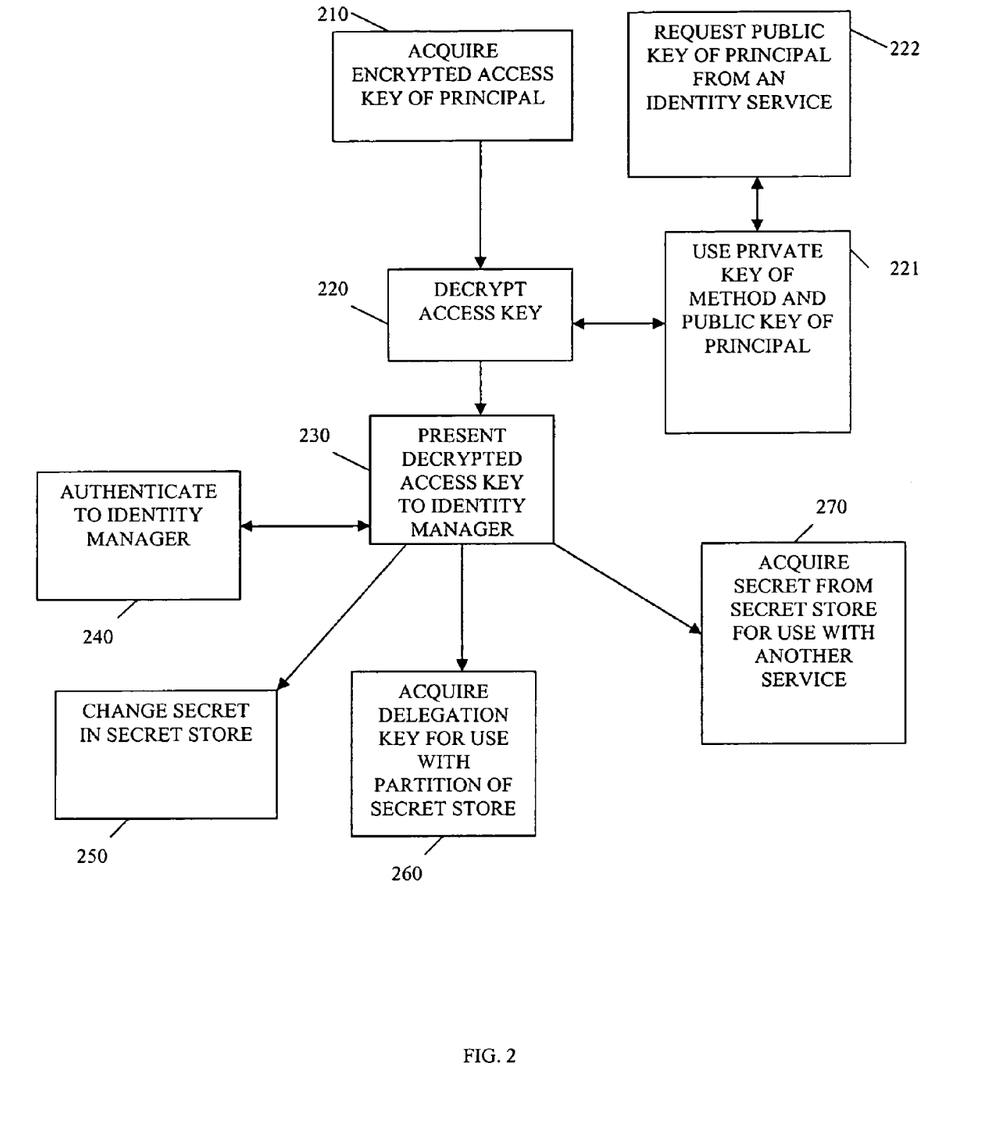
FIG. 2 is a diagram of method for acquiring access to a secret store, according to an example embodiment.

FIG. 2 is a diagram of method 200 for acquiring access to a secret store, according to an example embodiment. The method 200 (hereinafter "administrative identity service" is implemented in a machine-accessible and readable medium and is operational over a network. The network may be wired, wireless, or a combination of wired and wireless. In an embodiment, the administrative identity service interacts with the identity management service represented by the method 100 of FIG. 1 to acquire secrets of a principal for purposes of synchronizing, modifying, and/or managing secrets on behalf of that principal.

The administrative identity service may be viewed as the processing associated with the first principal that was discussed above with the description of the method 100 depicted in FIG. 1. That is, the administrative identity service may be an automated service or agent that manages a particular service, group of services, or all services associated with a given principal. In other cases, the administrative identity service may be partially automated, such as when an administrator accesses interfaces to perform operations on behalf of the given principal. So, the administrative identity service may be entirely automated or may be partially automated and having some manual interaction.

The administrative identity service is in a trusted and secure relationship with the principal for whom the administrative identity service processes identity management services. In order for the administrative identity service to gain access to a secret store of the principal. The administrative identity service first acquires an access key to the secret store and then uses that access key to contact an identity manager that controls the secret store. The identity manager may not even retain the access key, so the access key must first be shared by the principal with the administrative identity service. A variety of techniques may be used to achieve this sharing.

Correspondingly, at 210, the administrative identity service acquires an encrypted access key to a secret store for a given principal from that principal. At 220, the administrative identity service decrypts that encrypted access key.

According to an embodiment, at 221, the encrypted access key may be decrypted by using a public-private key pair technique. That is, the administrative identity service uses its private key and a public key of the given principal to decrypt the encrypted access key. In an embodiment, at 222, the public key of the principal may be acquired from an identity service. The identity service is a trusted third party of both the administrative identity service and the principal, and policy or contracts may permit the identity service to distribute the public key of the principal to the administrative identity service upon request. Examples of identity services that can perform such services were described and incorporated by reference herein and above.

It should be noted that other types of encryption or secure mechanisms to distribute and share the access key between the administrative identity service and the principal may be used. For example, the access key may be stored within the identity service and the administrative identity service may directly acquire it from the identity service in a different encrypted format or in an unencrypted format. In fact, any secure mechanism for distributing and sharing the access key can be used with other embodiments of the invention and are intended to fall within the scope described herein.

Once the administrative identity service has a decrypted version of the access key to the principal's secret store, the administrative identity service can, at 230, present the access key to an identity manager that controls access to the secret store on behalf of the principal. In some cases, at 240, prior to presenting the access key, the administrative identity service may independently authenticate itself to the identity manager. An example identity manager service was presented above with the description of the method 100 of FIG. 1.

Once access is given to the secret store of the principal, the administrative identity service may perform a variety of actions. Again, some of these actions may be restricted based on policy. For example, at 250, the administrative identity service may change a secret in the secret store on behalf of the principal. Additionally, the administrative identity service may acquire a delegation key from the secret store for use with a partition of the secret store when that partitioned is separately governed by either the delegation key and/or by a different identity manager or different service.

In some cases, at 270, the administrative identity service may acquire a secret from the secret store for use with another service of the principal. An example of such as situation was described above with the description of FIG. 1 and the method 100. Thus, the administrative identity service may do this to change a password or secret used by the principal's service and then store the change back to the secret store at 250.

Changes made by the administrative identity service may also cause the identity manager to synchronize other secret stores or partitions associated with the secret store. Such a situation was described in detail above with the description of FIG. 1 and the method 100.

In an embodiment, the administrative identity service may not actually make a change to a secret in the secret store of the principal; rather, the administrative identity service may propose a change to a secret via an annotation on that secret within the secret store. This annotation may be presented to the principal when the principal access the secret store via the identity manager. If the principal accepts the change then the change may be enforced or updated, if the principal rejects the change then the change is not made to the corresponding secret to which the change relates.

For example, suppose an enterprise password format is changed or a new facility is added. The administrative identity service may annotate the secret store or partition of the secret store with a new password for the principal to use and the principal may manually accept this when the principal next interacts with the secret store. The annotation may itself be stored in a partition that the principal has delegated for the administrative identity service to use, once the principal accepts the annotation change, the identity manager can synchronize the change back to the master secret store of the principal. In this manner, some changes by policy may require manual verification by the principal and until manual verification occurs the changes may remain in partitions that are not yet synchronized with the master secret store.

Figure 3:
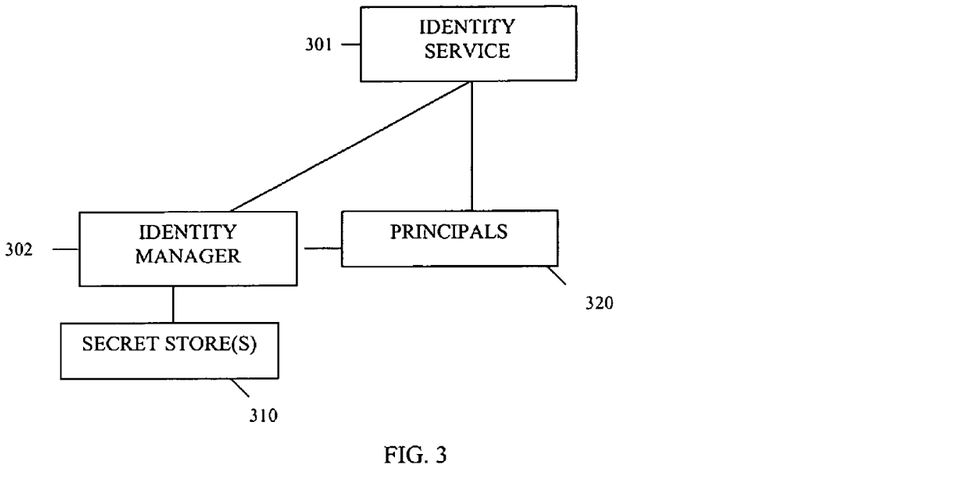
FIG. 3 is a diagram of a secret store synchronization and sharing system, according to an example embodiment.

FIG. 3 is a diagram of a secret store synchronization and sharing system 300, according to an example embodiment. The secret store synchronization and sharing system 300 is implemented in a machine-accessible and readable medium and is operational over a network. The network may be wired, wireless, or a combination of wired and wireless. In an embodiment, the secret store synchronization and sharing system 300 implements, among other things, the identity management service represented by the methods 100 of the FIG. 1.

The secret store synchronization and sharing system 300 includes an identity service 301 and an identity manager 302. The identity service 301 and the identity manager 302 interact with principals 320 and secret stores 310 of those principals 320. Each of the components of the secret store synchronization and sharing system 300 will now be discussed in turn.

The identity service 301 acts as trusted third party that administers authentication mechanisms, identities, and identifier information on behalf of the identity manager 302 and the principals 320 that interact with the identity manager 302. Some example identity services 301 were described and incorporated by reference above.

One feature of the identity service 301 is to provide a public or common key associated with one principal 320 to another principal 320. The public key may be used distributed for purposes of permitting a particular principal 320, such as an administrative identity service described with the method 200 of FIG. 2, to decrypt an encrypted secret store access key. The particular principal 320 uses its own secure private key and the public key of a different principal 320 associated with the secret store 310 to decrypt the encrypted access key. Thus, one aspect of the identity service 301 is to facilitate encryption and/or decryption keys between the principals 320.

Another use for the identity service 301 may be to actually supply the access key to the secret store 310 of a first principal 320 to a second principal 320. Policies and/or contracts established with the identity service 301 drive what types of keys and information is supplied between the principals 320 via the identity service 301.

Additionally, in some embodiments, the entries within the secret store 310 which represent secrets of a particular principal 320 may be encrypted with the public key of the particular principal and a private key of the identity manager 302. Thus, when an authorized different principal 320 seeks a particular secret from the secret store 310, the identity manager 302 may decrypt the secret and re-encrypt it with the public key of the requesting principal's public key. The requesting principal 320 then acquires the public key of the identity manager 302 from the identity service 301 to decrypt the secret.

In fact a variety of encryption schemes and dual schemes may be used to encrypt the entries within the secret store 310 and to facilitate communication of common keys between the parties. The identity service 301 provides a mechanism to securely communicate these common keys between the parties. The common keys may be used to decrypt an access key to acquire access to the secret store 310 and/or may be used to decrypt secrets housed as entries within the secret store 310.

The identity manager 302 controls access to the secret store 310 on behalf of principals 320. A principal 320 may be the owner of a particular secret store 310 for some transactions with the identity manager 302 and may be an agent authorized to access a different secret store 310 of another different principal 320 for other different transactions with the identity manager 302.

The identity manager 302 grants access to a particular secret store 310 if a presenting principal 320 possess a proper access key to gain access to that particular secret store 310. Once access is granted, then the types of operations and access rights of any given principal 320 to the secret store 310 may be monitored by the identity manager via defined policies and the activities of the principal 320 may be logged for purposes of subsequent auditing and/or reporting.

In an embodiment, the identity manager 302 may partition a given secret store 310 into one or more subsets or replicated copies on behalf of a given principal 320. The given principal 320 may then establish separate delegated access keys for each different partition of the secret store 310. The delegated access keys are then communicated to other principals 320 that the given principal 320 wants to give access to. Each partition may also have its own set of policies defining access rights and/or defining the types of logging that is to occur with a given partition.

In embodiments that include partitions of the secret store 310, the identity manager 302 may keep the partitions in synchronization with one another and with the master version of the secret store 310. In some cases, some partitions may be temporarily and intentionally out of synchronization with the master secret store 310 until the owning principal 320 of that secret store 310 accepts an annotated and proposed change which is included within a given partition and placed there by an authorized different principal 320.

Thus, the identity manager 302 may present suggested or proposed modifications to a number of secrets within the secret store 310 to a principal 320 for acceptance or non acceptance. If acceptance occurs, the partition can be synchronized with the master secret store 301, if acceptance is not obtained then synchronization will not be done and in fact the proposed modification may be backed out of the partition to which it relates.

During an example interaction, a first principal 320 is given an encrypted access key for use with a secret store 310 of a second principal 320. The first principal interacts with the identity service 301 to acquire the public or common key of the second principal 320 and uses the public key of the second principal 320 and a private key of the first principal 320 to decrypt the access key. The access key is then presented to the identity manager 302 and validated. The first principal 320 then has access to the secret store 310 or a particular partition of the secret store 310 if the access key was associated with a particular partition and not the secret store 310 as a whole. Next, policy dictates changes and synchronization activities of both the first principal 320 and the identity manager 302.

Figure 4:
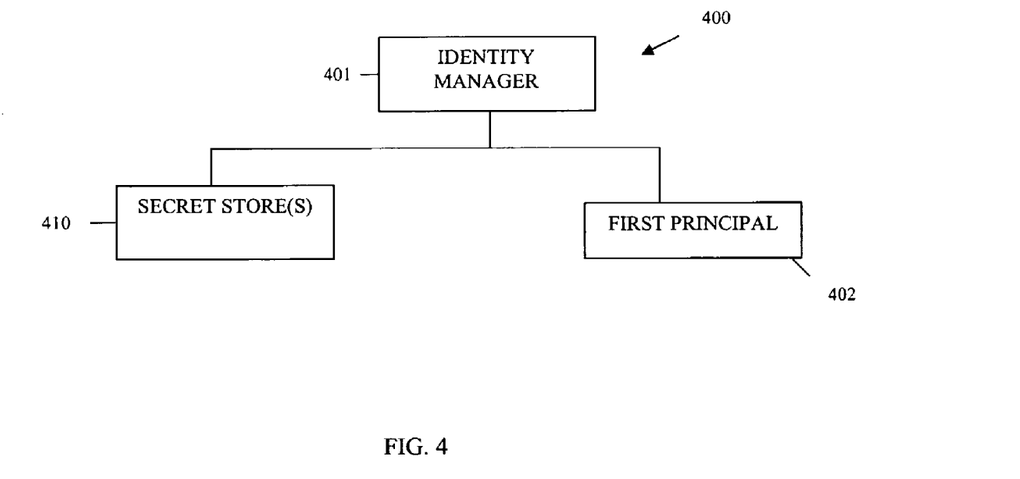
FIG. 4 is a diagram of another secret store synchronization and sharing system, according to an example embodiment.

FIG. 4 is a diagram of another secret store synchronization and sharing system 400, according to an example embodiment. The secret store synchronization and sharing system 400 is implemented in a machine-accessible and readable medium and is accessed and processed over a network. The network may be wired, wireless, or a combination of wired and wireless. In an embodiment, the secret store synchronization and sharing system 400 implements among other things the processing associated with the identity management service and the administrative identity service represented by the methods 100 and 200 of FIGS. 1 and 2, respectively.

The secret store synchronization and sharing system 400 represents an alternative implementation to the secret store synchronization and sharing system 300 of FIG. 3 in that the secret store synchronization and sharing system 400 of FIG. 4 includes the processing of a particular type of agent principal. This processing was described with the administrative identity service represented by the method 200 of FIG. 2.

The secret store synchronization and sharing system 400 includes an identity manager 401 and a first principal 402. The identity manager 401 and the first principal 402 interact with one another for purposes of managing secrets on behalf of a different and second principal; these secrets are housed in a secret store 410.

The identity manager 401 controls and synchronizing access to the secret store 410. Access is granted to a first principal 402 that possess a valid access key. The secret store 410 may be logically segmented into one or more partitions. Each partition may include its own unique access key. In some embodiments, the master version of the secret store 410 includes an identification of the other partitions, if any, and includes a delegation or unique access key for each of any such partitions. This permits the identity manager 401 to access the partitions even if they are not within the control of the identity manager 401 and to synchronize changes when it is appropriate to do so.

When a first principal 402 acquires a valid access key to either the entire master version of the secret store 410 or to a particular partition, and presents that key to the identity manager 401, access is granted to the secret store 410 or the partition. Access activities may be governed by policies managed by the identity manager 401. Moreover, if changes are made, then the identity manager 401 detects the change and may based on policy synchronize the change to other partitions associated with the secret store 410 by acquiring the appropriate delegation keys for each partition that requires synchronization. In some cases, synchronization does not occur until the second principal that owns the secret store 410 authorizes or commits to its proposed change.

In an embodiment, the first principal 402 can acquire the access key from the second principal in an encrypted format, where the encrypted key is encrypted with a public key of the second principal. The encrypted access key is decrypted using a private key of the first principal 402 and the public key of the second principal. The public key may be acquired from an identity service as described above.

The second principal permits encrypted versions of its secrets to be managed by the identity manager 401. Different partitions or the entire secret store 410 that includes the secrets may be delegated to a first principal 402 that acts as an agent on behalf of the second principal. The agent permits automated management of the second principal's secrets. This improves management and provides security for the secrets of the second principal.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a machine, comprising:

receiving, by the machine, a key from a first principal to access a secret store belonging to and controlled by a second principle but the secret store is controlled and is managed by an identity management service on behalf of the second principal within a secure environment, the identity management service does not store the key and the key is used by the identity management service to both decrypt the secret store and the re -encrypt the secret store;

validating, by the machine, the key;

granting, by the machine, access to the secret store in response to the key being validated and in response to a contract that defines a relationship between the first and the second principals, the contract including policies: that limit operations that the first principal can make against the secret store, that are applied against specific entries within the secret store, and that define an amount of time that the first principal can access the secret store, and applying, by the identity manager, additional global policies against access to the secret store and all secret stores managed by the identity manager, and sending the second principal periodic reports detailing activities of the first principal with respect to the secret store;

updating, by the machine, the secret store in response to actions of the first principal; and propagating, by the machine, changes caused by the update to one or more partitions associated with the secret store.

2. The method of claim 1 further comprising, acquiring, by the machine, a delegation key for use in accessing each of the one or more partitions, wherein the delegation key is housed in the secret store.

3. The method of claim 1, wherein receiving further includes authenticating the first principal.

4. The method of claim 1, wherein granting further includes providing one or more secrets of the second principal to the first principal from the secret store.

5. The method of claim 1 further comprising, logging, by the machine, actions of the first principal with respect to the secret store.

6. A machine-implemented method to execute on a machine, comprising:

receiving, by the machine, an access key from a first principal that permits access to a secret store of the first principal, the secret store controlled by an identity manager within a secure environment and the access key is not stored by the identity manager and the access key is used by the identity manager for decrypting the secret store and then re-encrypting the secret store;

authenticating, by the machine, a second principal for access to the access key; and providing, by the machine, the second principal the access key once authenticated for access, and in response to a contract that defines a relationship between the first and the second principals, the contract including policies that limit operations that the second principal can make against the secret store, that are applied against specific entries within the secret store, and that define an amount of time that the second principal can access the secret store, and applying, by the identity manager, additional global policies against access to the secret store and all secret stores managed by the identity manager, and sending the first principal periodic reports detailing activities of the second principal with respect to the secret store;

receiving, by the machine, one or more delegation keys to access partitions of the secret store and providing the delegation keys if the second principal is authenticated for access to the delegation keys; and propagating updates to the secret store or to the partitions if changes are detected in the one of the partitions of the secret store.

7. A system, comprising:

a machine having an identity service implemented in a non-transitory machine-readable medium and to execute on the machine; and the machine having an identity manger implemented in a non-transitory machine-readable medium and to execute on the machine, the identity service is to provide common keys, and the common keys are used to decrypt access keys, and the access keys are to be presented to the identity manager by a first principal to gain access to secret stores associated with other principals and access is defined by contracts in the secret stores that defines relationships between the first principal and the other principals, the secret stores are controlled by the identity manager within a secure environment and the access keys are not stored by the identity manager and the access keys is used by the identity manager to decrypt the secret stores and then re-encrypt the secret stores, the contracts including : that limit operations that the first principal can make against the secret store, that are applied against specific entries within the secret store, and that define an amount of time that the first principal can access the secret store, and applying, by the identity manager, additional global policies against access to the secret store and all secret stores managed by the identity manager, and sending the second principal periodic reports detailing activities of the first principal with respect to the secret store, wherein the common keys represent public keys of principals, and wherein the first principal is to access the identity service to acquire a particular common key associated with a second principal, and the particular common key and a private key of the first principal enable the first principal to decrypt an encrypted access key and the decrypted access key when presented to the identity manager permits the first principal to gain access to a particular one of the secret stores associated with the second principal.

8. The system of claim 7, wherein the identity manager is to partition a number of the secret stores and establish different access key for the partition.

9. The system of claim 7, wherein the identity manager is to synchronize updates made to entries of the secret stores with one or more other secret stores or partitions associated with the secret stores.

10. The system of claim 7, wherein the identity manager is to permit modifications to the secret stores in response to the access keys.

11. The system of claim 7, wherein the identity manager is to present suggested or proposed modifications to secrets in the secret stores to principals for acceptance or non acceptance.

12. A system, comprising:
a machine having an identity manager implemented in a non-transitory machine-readable medium and to execute on the machine; and
the machine a first principal implemented in a non-transitory machine-readable medium and to execute on the machine, the first principal is to provide an access key to the identity manager associated with a secret store of a second principal, the identity manager controls and manages the secret store on behalf of the second principal and the identity manager controls and manages updates and synchronization associated with changes to the secret store made by the first principal, the identity manager does not store the access key and the identity manage is to use the access key to decrypt the secret store and then re-encrypt the secret store, and
the secret store includes a contract that defines a relationship between the first principal and the second principal for access to the secret store of the second principal the contract including policies: that limit operations that the first principal can make against the secret store as enforced by the identity manager, that are applied against specific entries within the secret store, and that define an amount of time that the first principal can access the secret store, and applying, by the identity manager, additional global policies against access to the secret store and all secret stores managed by the identity manager, and sending the second principal periodic reports detailing activities of the first principal with respect to the secret store,
wherein the identity manager detects a change in the secret store and acquires a different key from the secret store, and wherein the identity manager uses the different key to synchronize the change with a partition of the secret store.

13. The system of claim 12, wherein the first principal is to acquire the access key from the second principal in an encrypted format, and wherein the encrypted format is encrypted with a public key of the first principal.

14. The system of claim 12, where the secret store includes one or more encrypted secrets of the second principal.

15. The system of claim 12, wherein the first principal is to annotate a number secrets of the second principal within the secret store, wherein the annotation suggest a change to the number of secrets which the second principal can accept or reject.

* * * * *

UNITED STATES PATENT AND TRADEMARK OFFICE
CERTIFICATE OF CORRECTION

PATENT NO.         : 8,095,960 B2
APPLICATION NO.    : 11/284364
DATED              : January 10, 2012
INVENTOR(S)        : Kevin M. Boogert et al.

It is certified that error appears in the above-identified patent and that said Letters Patent is hereby corrected as shown below:

In column 11, line 21, in Claim 1, delete "principle" and insert -- principal --, therefor.

In column 11, line 26, in Claim 1, delete "the re -encrypt" and insert -- re-encrypt --, therefor.

In column 12, line 7, in Claim 6, delete "policies" and insert -- policies: --, therefor.

In column 12, line 30, in Claim 7, delete "non-transitory" and insert -- transitory --, therefor.

In column 12, line 44, in Claim 7, delete "including :" and insert -- including: --, therefor.

In column 14, line 25, in Claim 15, delete "number" and insert -- number of --, therefor.

Signed and Sealed this
Twentieth Day of March, 2012

David J. Kappos
*Director of the United States Patent and Trademark Office*